United States Patent
Zoppas et al.

(10) Patent No.: US 9,833,987 B2
(45) Date of Patent: Dec. 5, 2017

(54) PROCESS OF MANUFACTURING AN INJECTION MOULD COMPONENT

(71) Applicant: S.I.P.A. Societa' Industrializzazione Progettazione E Automazione S.P.A., Vittorio Veneto (IT)

(72) Inventors: Matteo Zoppas, Conegliano (IT); Andrea Cavalet, Ponte Nelle Alpi (IT)

(73) Assignee: S.I.P.A. Societa' Industrializzazione Progettazione E Automazione S.P.A., Vittorio Veneto (IT)

( * ) Notice: Subject to any disclaimer, the term of this patent is extended or adjusted under 35 U.S.C. 154(b) by 171 days.

(21) Appl. No.: 14/930,047

(22) Filed: Nov. 2, 2015

(65) Prior Publication Data

US 2016/0052176 A1   Feb. 25, 2016

Related U.S. Application Data

(62) Division of application No. 14/125,676, filed on Dec. 12, 2013, now Pat. No. 9,211,669.

(51) Int. Cl.

| | |
|---|---|
| *B22F 3/105* | (2006.01) |
| *B22F 5/00* | (2006.01) |
| *B23K 26/342* | (2014.01) |
| *B33Y 80/00* | (2015.01) |
| *B29C 33/04* | (2006.01) |
| *B29C 45/73* | (2006.01) |
| *B33Y 10/00* | (2015.01) |
| *B23P 15/00* | (2006.01) |
| *B22F 3/22* | (2006.01) |
| *B29K 105/00* | (2006.01) |
| *B23K 101/20* | (2006.01) |

(52) U.S. Cl.
CPC .......... *B33Y 80/00* (2014.12); *B22F 3/1055* (2013.01); *B22F 5/007* (2013.01); *B23K 26/342* (2015.10); *B23P 15/007* (2013.01); *B29C 33/04* (2013.01); *B29C 45/7312* (2013.01); *B33Y 10/00* (2014.12); *B22F 3/225* (2013.01); *B23K 2201/20* (2013.01); *B29C 2045/7318* (2013.01); *B29K 2105/253* (2013.01); *B29K 2905/00* (2013.01); *Y02P 10/292* (2015.11); *Y02P 10/295* (2015.11)

(58) Field of Classification Search
CPC ................... B29C 45/7312; B29C 2045/7318
See application file for complete search history.

(56) References Cited

U.S. PATENT DOCUMENTS

RE38,396 E  *  1/2004  Gellert .................. B23P 15/007
                                                         228/171
2016/0214280 A1*  7/2016  Ulemek .............. B29C 45/7312

FOREIGN PATENT DOCUMENTS

| DE | 102007024744 | 1/2008 |
| EP | 1857244 | 11/2007 |
| WO | WO2007028702 | 3/2007 |
| WO | WO2007087913 | 8/2007 |

* cited by examiner

*Primary Examiner* — Robert B Davis
(74) *Attorney, Agent, or Firm* — Stetina Brunda Garred & Brucker

(57) ABSTRACT

An injection mold component for molding the outer surface of a preform neck, which allows improved cooling of the preform neck inside the mold, while at the same time reducing the mold cycle time. A related production process of said injection mold component, which allows the section of the cooling channels to be optimized, determining a more effective cooling, is also described.

3 Claims, 6 Drawing Sheets

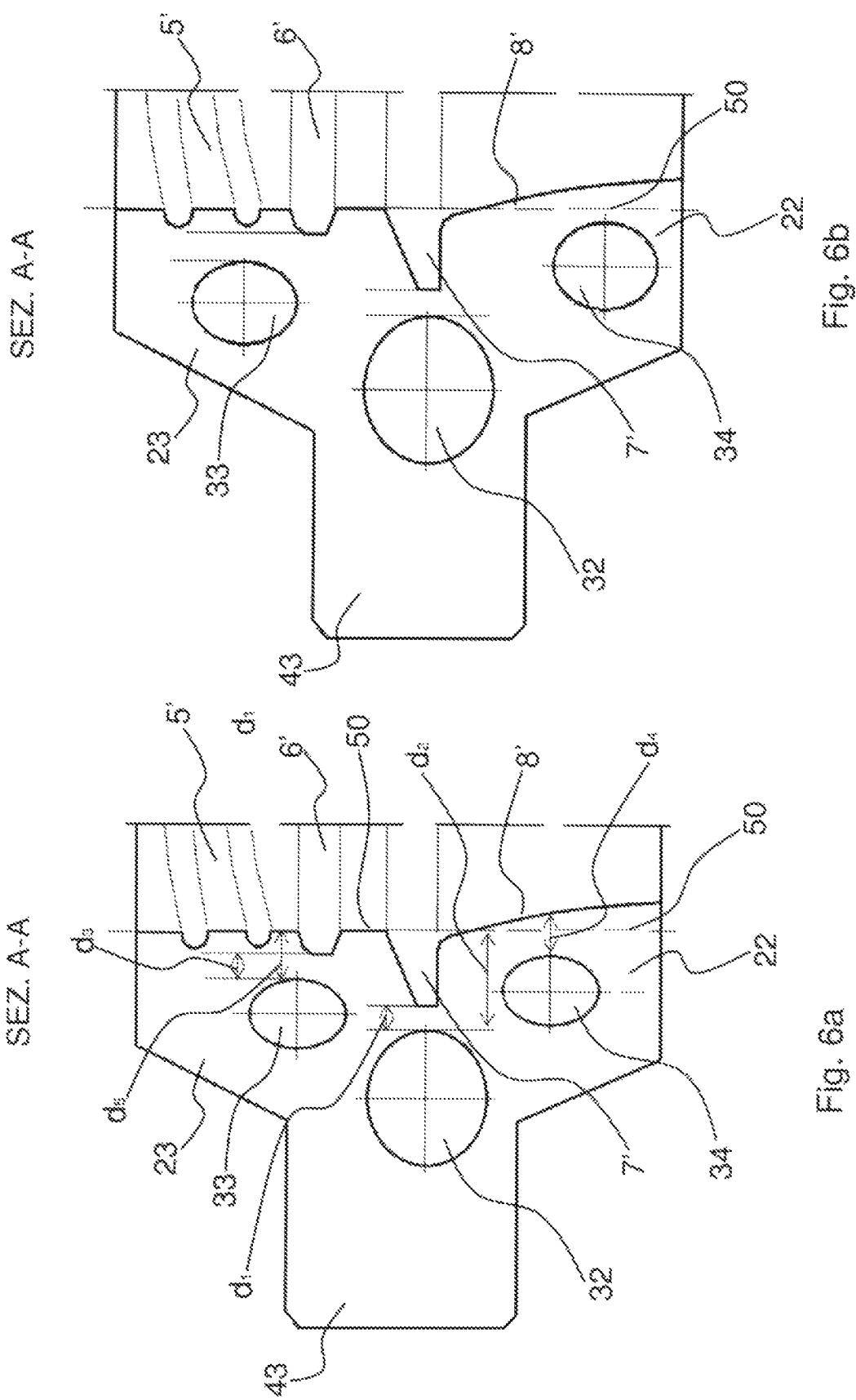

PROCESS OF MANUFACTURING AN INJECTION MOULD COMPONENT

CROSS-REFERENCE TO RELATED APPLICATIONS

This application is a divisional of U.S. patent application Ser. No. 14/125,676 filed on Dec. 12, 2013, which claims priority to PCT International Application No. PCT/IB2012/052974 filed on Jun. 13, 2012, which application claims priority to Italian Patent Application No. RM2011A000303 filed Jun. 14, 2011, the entirety of the disclosures of which are expressly incorporated herein by reference.

FIELD OF THE INVENTION

The present invention relates to an injection mould component for moulding the outer surface of a preform neck of a container made of plastic material, in particular a bottle. The invention also relates to a production process of said injection mould component.

BACKGROUND OF THE INVENTION

An example of a bottle preform made of plastic material is illustrated in FIG. 1a. This preform, globally indicated with the numerical reference 1, comprises an elongated cylindrical portion 2, that is closed at one end, and a neck 3. The elongated cylindrical portion 2 is then stretched and blown in the stretch-blow process to form a bottle for drinks or more generally for liquids. The neck 3, provided with an open end 4, has an outer surface comprising:

- a threaded end portion 5, onto which the cop-shaped cap is screwed;
- a first annular flange or support ring 7, that acts as a support for transport and seal, shaped in such a way as to be able to slide on longitudinal guides that support the neck of the bottle from both sides to support and retain the bottle as it advances downstream of the container production plant;
- a possible second annular flange 6, that acts as seal tearing, shaped in such a way as to retain, once the cap has been inserted into the neck 3 of the bottle, the annular seal placed at a preset position between the first flange 7 and the second flange 6;
- a possible slightly conical annular portion 8, beneath the first annular flange or support ring 7, which has the function of cooperating, in the handling operations before the blowing, with said support ring 7 to slide on the longitudinal guides of advancement and transport of the bottle downstream of the container production plant.

Where only one of the two annular flanges is provided, this flange may have the dual function of "support ring" and "seal tearing". In this case, following coupling of the cap onto the neck 3 of the bottle, the annular seal is placed at a preset position beneath the flange at the conical annular portion 8.

In greater detail, the conical annular portion 8 is defined by the tubular stretch of preform comprised between the annular flange 7 and the joint section 8, placed between the lower end of the neck 3 and the elongated cylindrical portion 2 defining the containment body of the bottle.

The preform 1 is normally produced by means of an injection process into an injection mould 10 primarily comprising the components shown in FIG. 2. The cooling function is exercised by the respective cooling system that each of these components has.

The main components of the injection mould 10 are:
- a first mould component 11, called external mould component of the neck or more simply "neck ring", which defines the shape of the outer surface of the preform neck 3, including the threaded portion 5;
- a second mould component 12, called internal mould component of the preform or more simply male component (or elongated core), which defines the inner surface of the entire preform;
- a third mould component 13, called external mould component of the cylindrical portion 2 of the preform or more simply cavity, which defines the outer surface of the cylindrical portion 2.

The first component 11 consists of two separate threaded half-inserts, the internal curved surfaces of which define, once the two half-inserts are mounted together in the rest of the mould (FIG. 2), a through opening to mould the outer surface of the preform neck 3. Each threaded half-insert is provided with a cooling circuit within its body.

The third component 13 may also, in certain cases, consist of two separate half-inserts that are cooled by means of two independent cooling circuits or by a single circuit that provides for the passage in series from one half-insert to the next.

Taking into consideration the external part of the preform neck 3, comprising the threaded portion 5, the first annular flange or support ring 7 and the conical annular portion 8 up to the level of the plane P indicated in FIG. 2, it emerges that the preform neck is cooled by the first mould component 11 and by the third mould component or cavity 13. However, the greatest weight in terms of cooling capacity is to be attributed to the first mould component 11.

It is imperative that the cooling function at the level of the preform neck is achieved in an optimal manner before extracting the preform from the mould, in order to ensure the high quality of the injected product and at the same time a contained cycle time.

Having the shortest possible cycle time in fact permits greater profitability, particularly in the mass productions that are typical of these products.

The cooling channels 14, 15 can be seen in the section of FIG. 2 in the half-inserts of the neck ring 11 and in the cavity 13 respectively. In particular, the cooling channels 14 are produced in such as way as to effectively cool only one part of the outer surface of the preform, in particular the part at the level of the support ring 7 (zone indicated by K in FIG. 1), while the zones marked with the rectangles 16, 17 in FIG. 2 (corresponding to the zones indicated by J and L of the preform in FIG. 1) are away from cooling channels and are not therefore adequately cooled.

For this reason such zones are critical from the point of view of cooling, and the moulding cycle time will depend in a determining way on the capacity of the mould to evacuate heat from said zones.

The same drawback can also be found in the case of a preform with unthreaded neck, illustrated byway of example in FIG. 1b.

Alternative solutions to the conventional solution described above are already on the market. For example, the document EP0768164A2 describes a mould component, formed by two separate threaded half-inserts, for moulding the outer surface of a preform neck. This component partially resolves these drawbacks but has the following limitations.

Disadvantageously, the cooling channels are completely external to the upper and lower truncated cone end zones of said mould component determining a low cooling in the corresponding zones of the preform neck. The arrangement of the two pieces of each half-insert, in fact, determines a space insufficient for the production of the channels in said truncated cone end zones by conventional processing technologies.

In addition, since the cooling channels are entirely produced by means of the normal stock-removal process, they cannot be created vary close to the moulding surface and the section of these channels cannot be adequately optimised whereby they present unconnected edges that cause stagnation points of the cooling liquid and consequent low cooling in particular zones.

A further disadvantage is represented by the fact that each half-insert of said component is produced by joining two pieces by braze-welding, determining a limited structural resistance.

There is therefore a need to provide an injection mould component to mould the outer surface of the preform neck, which allows the aforementioned drawbacks to be overcome.

SUMMARY OF THE INVENTION

The main aim of this invention is that of providing for an injection mould component for moulding the outer surface of a preform neck, which allows an improved cooling of the preform neck inside the mould, at the same time reducing the mould cycle time.

A further aim of the invention is that of providing for a related production process of said injection mould component, which allows the section of the cooling channels to be optimised, determining a more effective cooling.

The present invention, therefore, proposes to achieve the aforementioned aims by providing an injection mould component that, according to claim 1, comprises a pair of half-inserts that define, once assembled in the injection mould, a moulding surface of said outer surface of the neck; said moulding surface defining a longitudinal axis and comprising a first annular groove for making a first annular flange of the preform neck;
a cylindrical end portion, arranged at a first, side of said first annular groove, for making a corresponding cylindrical end portion of the preform neck;
and a portion proximal to said first annular groove and arranged at a second side of said first annular groove, for making a corresponding portion proximal to the first annular flange,
wherein each half-insert is provided with an internal circuit for the passage of a cooling liquid; said internal circuit being provided with a first curved stretch and with a second curved stretch provided in proximity of said first annular groove of the moulding surface; a third curved stretch provided in proximity of said cylindrical end portion of the moulding surface; a fourth curved stretch provided in proximity of said tapered portion of the moulding surface; and wherein third curved stretch and fourth curved stretch are branches of said first curved stretch and converge in said second curved stretch.

The first curved stretch and the second curved stretch have a respective curvilinear axis, arranged on a first plane substantially perpendicular to a plane containing the longitudinal axis of the moulding surface, and can be symmetrically arranged with respect to a centre-line plane Z of the half-insert. The third curved stretch has a curvilinear axis arranged on a second plane and the fourth curved stretch has a curvilinear axis arranged on a third plane, said second plane and third plane being substantially parallel to said first plane.

The internal circuit is also provided with a longitudinal inlet stretch and a longitudinal outlet stretch for the cooling liquid, defining respective axes which are substantially parallel to each other and to the longitudinal axis of said moulding surface. A first longitudinal connection stretch connects the longitudinal inlet stretch to the first curved stretch and a second longitudinal connection stretch connects the second curved stretch to the longitudinal outlet stretch, said longitudinal connection stretches being arranged on said first plane.

The moulding surface can include a second annular groove for providing a second annular flange of the preform neck, provided between said first annular groove and said cylindrical end portion.

A second aspect of this invention provides a manufacturing process for an injection mould component comprising a pair of half-inserts, each half-insert consisting of two parts integrally connected to each other; the process comprising, the production, starting from metal powder, of at least a first part of each half-insert, comprising the first curved stretch, the second curved stretch, the third curved stretch and the fourth curved stretch, by means of Sintering Laser Melting or Laser Cusing.

The cooling capacity is function of various parameters, such as the proximity of the cooling channels to the moulding surface and the inner surface of said channels, the latter being in turn function of the cross section and of the length of the channels themselves.

Advantageously the mould component, object of the present invention, is provided with cooling circuits, one for each half-insert, configured in such a way as to adequately cool all the critical zones of the preform neck (zones indicated by J, K and L in FIG. 1). Indeed, such cooling circuits are provided with at least one branch of the cooling circuit both in proximity of the portion of moulding surface corresponding to the, possibly threaded, cylindrical and portion of the neck and in proximity of the portion of moulding surface corresponding to the support ring and in proximity of the portion of moulding surface corresponding to the substantially conical portion of the neck. In this way, the cooling channelling is in proximity of the entire moulding surface of the mould component of the neck and cooling will therefore be optimal.

Furthermore, the arrangement of the stretches or branches of the cooling circuit in proximity of all the zones where the preform is thickest allows a better evacuation of the heat and consequently greater advantages in terms of the moulding cycle time and the quality of the preform.

A further advantage is represented by the fact that the cooling channels are produced by means of technologies such as SLM (Sintering Laser Melting), Laser Cusing or equivalent technologies that allow products to be produced starting from metal powder. Compared to traditional stock-removal processes, these technologies allow:

- the obtainment of cooling channels, with circular or elliptical section for example, well connected to each other, allowing a better flow of the cooling liquid, less load losses and a better heat transfer;
- the production of part of the cooling system also inside the upper and lower truncated cone end parts of the component of the invention.

The mould component of the invention allows the obtainment of moulded products having a temperature profile at the outlet of the mould that is significantly lower with respect to the moulded products obtained with mould components provided with conventional cooling channels. This also allows temperature gradients on the moulded product to be avoided; this condition normally occurs on conventional moulded products due to the non-optimal distribution of the cooling.

Translating this in performance terms, the greater cooling obtainable with the mould component of the invention translates into a variable reduction in the cycle time of between 5% and 15% depending on the profile of the preform, into a greater compliance with the dimensional tolerances of the product and into a better preform qualify (less stresses, better quality of the PET or of another suitable material).

The dependant claims describe preferred embodiments of the invention.

BRIEF DESCRIPTION OF THE DRAWINGS

Further characteristics and advantages of the invention will become clearer in the light of the detailed description of a preferred but non-exclusive embodiment of an injection mould component for preforms, illustrated by way of a non-limiting example, with the assistance of the accompanying drawings, wherein:

FIG. a represents a perspective view of a bottle preform;

FIG. 6a represents a cross section of a portion of a first variant of the component according to the invention;

FIG. 6b represents a cross section of a portion of a second variant of the component according to the invention.

The same reference numbers in the drawings identify the same elements or components.

DETAILED DESCRIPTION OF PREFERRED EMBODIMENTS OF THE INVENTION

With reference to FIGS. 3 to 6, these represent an embodiment of an Injection mould component for moulding the outer surface of the neck of a preform made of plastic material, said component being known as "neck ring".

Figure 1B:
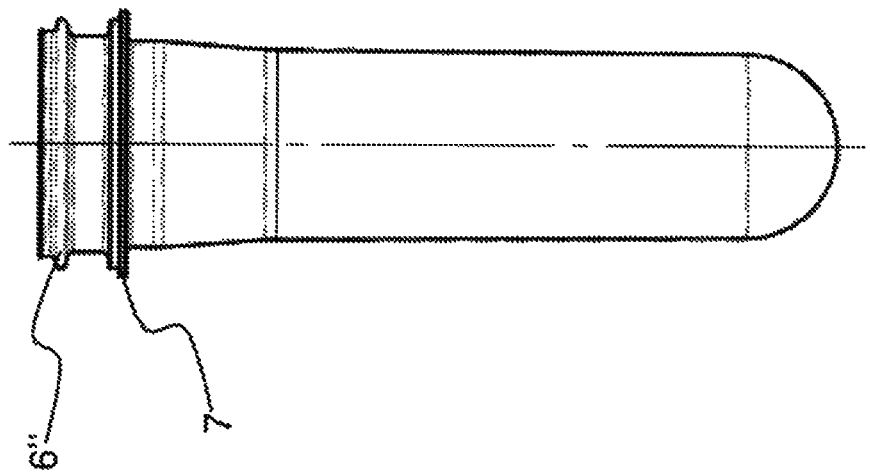
FIG. 1b represents a perspective view of a further bottle preform.
Figure 1A:
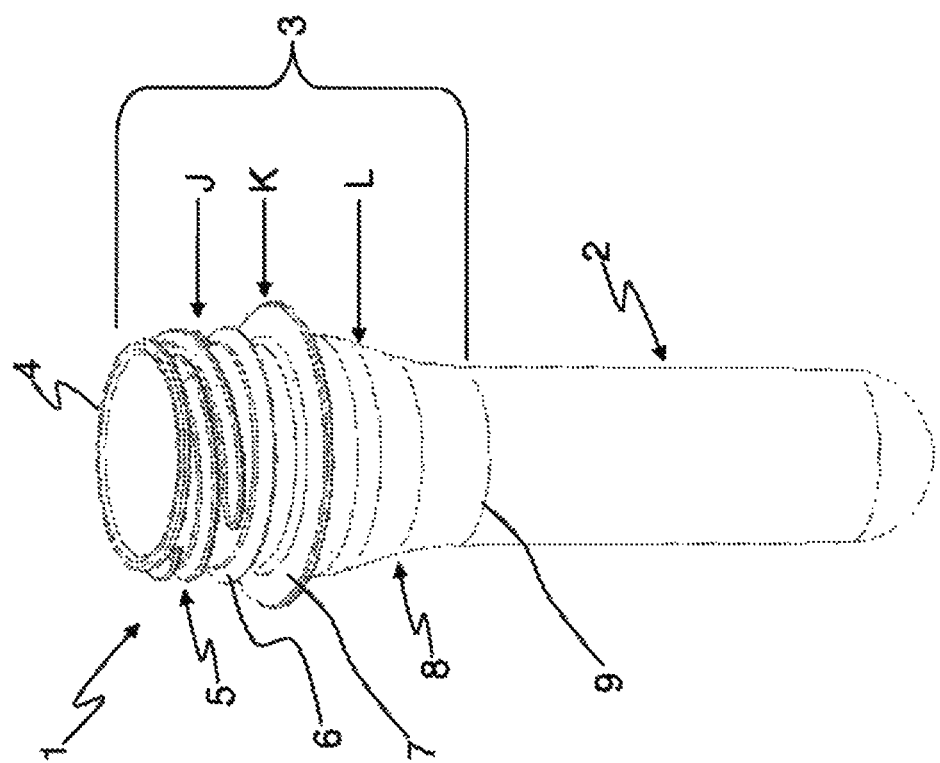

The mould component, object of the present invention, comprises two separate threaded half-inserts 18, 19, the internal curved surfaces 20 thereof define, when one the two half-inserts 18, 19 have been mounted together in the rest of the mould (as in FIG. 2 for example), a through opening and a moulding surface for moulding the outer surface of the neck of a preform such as, for example, the one illustrated in FIG. 1a.

Each internal curved surface 20 has a substantially semi-circular profile and is provided with:

a semicircular groove 7', half of an annular groove having a profile corresponding to the profile of the annular flange or support ring 7 of the preform neck to be moulded;

a possible further semi-circular groove 6'; half of a further annular groove having a profile corresponding to the profile of the possible annular seal-tearing flange 6 of said neck;

a semi-cylindrical, entirely threaded, end portion 5', half of the cylindrical end portion having a profile corresponding to the profile of the threaded end portion 6 of the neck to be moulded, which extends between the groove 7' or the groove 6' and one end 4' of the curved surface 20.

Figure 2:
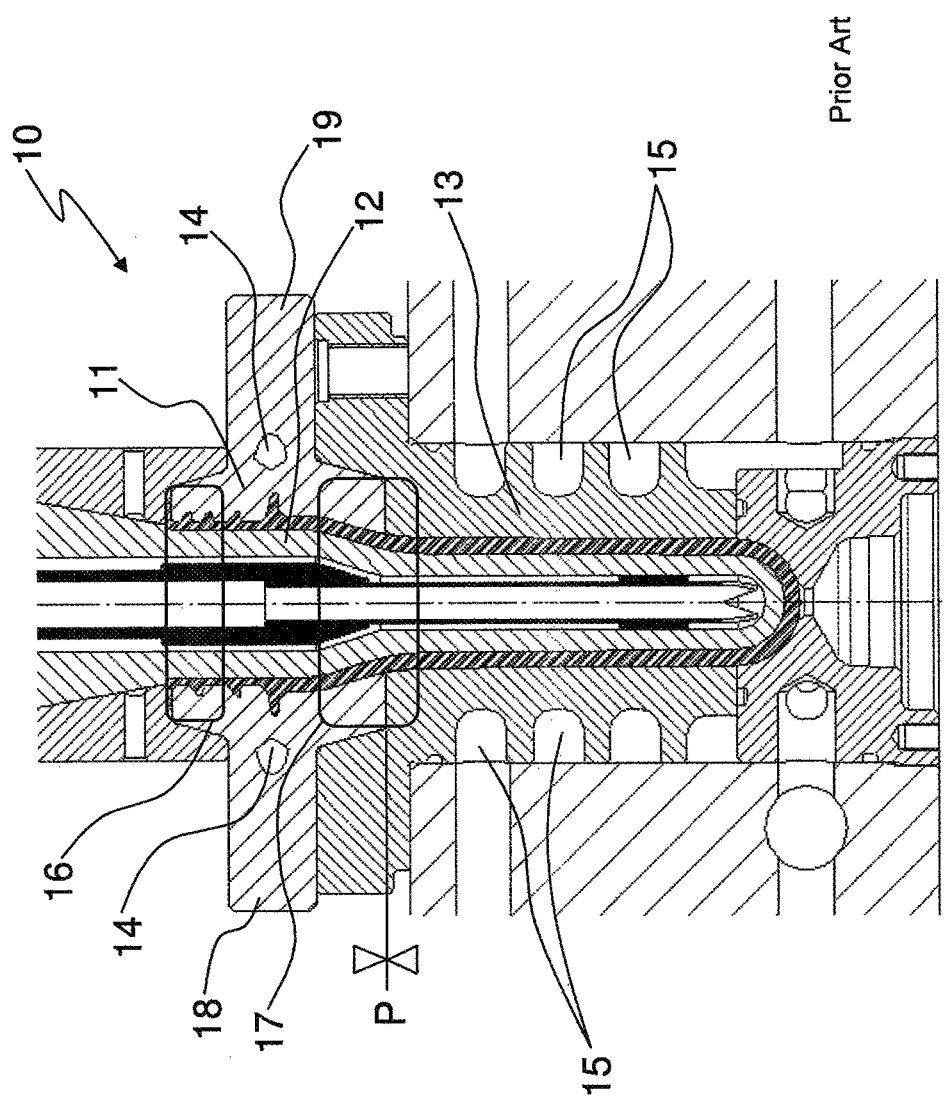
FIG. 2 represents a cross section of an Injection mould of the prior art.
Figure 3:
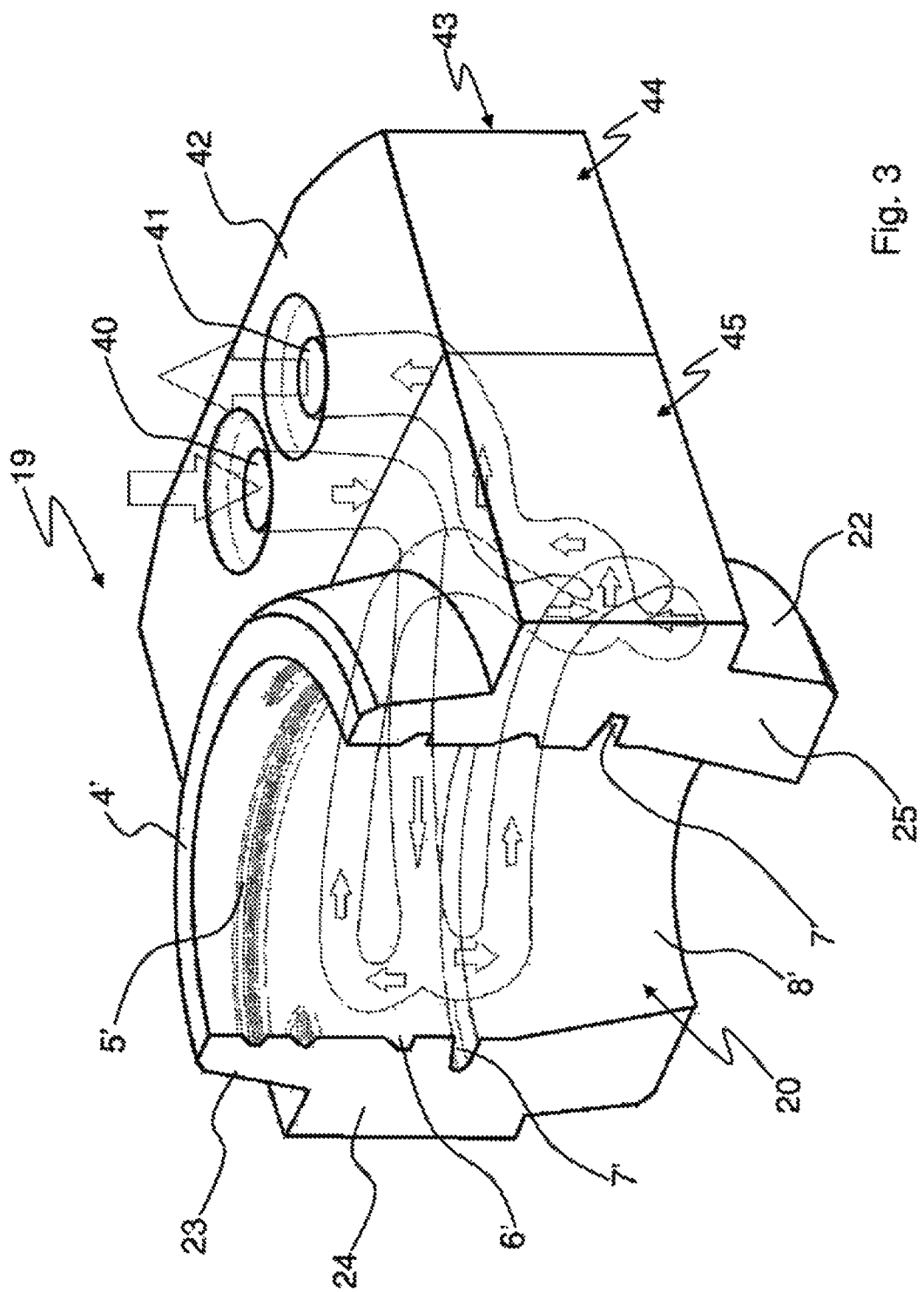
FIG. 3 represents a portion of the mould component according to the invention.

Each half-insert 18, 19 is also provided with portions of tapered flange 22, 23, having for example a truncated cone shape. When the two half-Inserts 18, 19 are mounted together in the rest of the mould, they are fixed together to form a seal by means of said portions of tapered flange 22, 23, these portions 22, 23 being restrained by the rest of the mould (FIG. 2). In this position, the respective internal flat contact surfaces 24, 25 of each half-insert rest on each other and the curved surfaces 20 combine to form the moulding surface and define the aforementioned through opening in which, during the moulding, the internal mould component or elongated core extends to form the inner surface of the preform.

Each threaded half-insert 18, 19 is provided within its body with a cooling circuit inside which a cooling liquid, such as water, can flow. Said cooling circuit comprises (FIGS. 4 to 6):

a longitudinal inlet stretch 30 for the inlet of the wafer, defining an axis that is substantially parallel to the longitudinal axis of the through opening defined by the curved surfaces 20, i.e. parallel to the longitudinal axis of the preform when it is present within the infection mould; said stretch 30, extending from an inlet section 40 provided on an outer surface 42 of the central portion 43 of the threaded half-insert that is intermediate to said portions of tapered flange 22 and 23;

a longitudinal outlet stretch 37 for the outlet of the wafer, also defining an axis that is substantially parallel to the longitudinal axis of the through opening defined by the curved surfaces 20, i.e. parallel to the longitudinal axis of the preform when it is present within the injection mould; said stretch 37 extending from one outlet section 41 provided on said outer surface 42;

a curved stretch 32, the curvilinear axis thereof is arranged on a first plane which is substantially perpendicular to a plane containing the longitudinal axis of the stretch 30, has an extension equal to the width of a circular sector having an angle of around 80+90° at the centre and is substantially equidistant from a corresponding portion of the semi-circular groove 7;

a longitudinal connection stretch 31 for connecting the stretch 30 to the stretch 32, arranged on said first plane;

a curved stretch 33, which is a branch of the curved stretch 32, having a curvilinear axis arranged on a second plane which is substantially perpendicular to a plane containing the longitudinal axis of the stretch 30 and positioned above the first plane; the curvilinear axis of said curved stretch 33, having an extension equal to a circular section of around 170+180°, is substantially equidistant from a lateral semi-cylindrical surface 50 (FIG. 6a) comprising the base surface on which the threading of the internally threaded portion 5', the semi-circular groove 7' and the possible semi-circular groove 6' are formed;

a curved stretch 34, which is a branch of the curved stretch 32, having a curvilinear axis arranged on a third plane which is substantially perpendicular to a plane containing the longitudinal axis of the stretch 30 and positioned beneath said first plane; the curvilinear axis of said curved stretch 33, having an extension equal to a circular sector having an angle of around 170+180° at the centre, is substantially equidistant from said lateral semi-cylindrical surface 50 (FIG. 6*a*);

a first joint stretch 32' connecting said curved stretch 32 on the first plane to said curved stretch 33 on the second plane;

a second joint stretch 32" connecting said curved stretch 32 on the first plane to said curved stretch 34 on the third plane;

a curved stretch 35, in which the curved stretch 33 and the curved stretch 34 converge, the curvilinear axis thereof is arranged on said first plane, is substantially equidistant from a corresponding portion of the semi-circular groove 7' and has an extension equal to a circular sector having an angle of around 80+90° at the centre, a third joint stretch 35' connecting said curved stretch 33 on the second plane to said curved stretch 35 on the first plane;

a fourth joint stretch 35" connecting said curved stretch 34 on the third plane to said curved stretch 35 on the first plane;

a longitudinal connection stretch 36 for connecting the stretch 35 to the stretch 37, arranged on said first plane.

The joint stretches 32', 32", 35', 35" are also curvilinear, thus preventing the formation of stagnation points of the cooling liquid.

Figure 4:
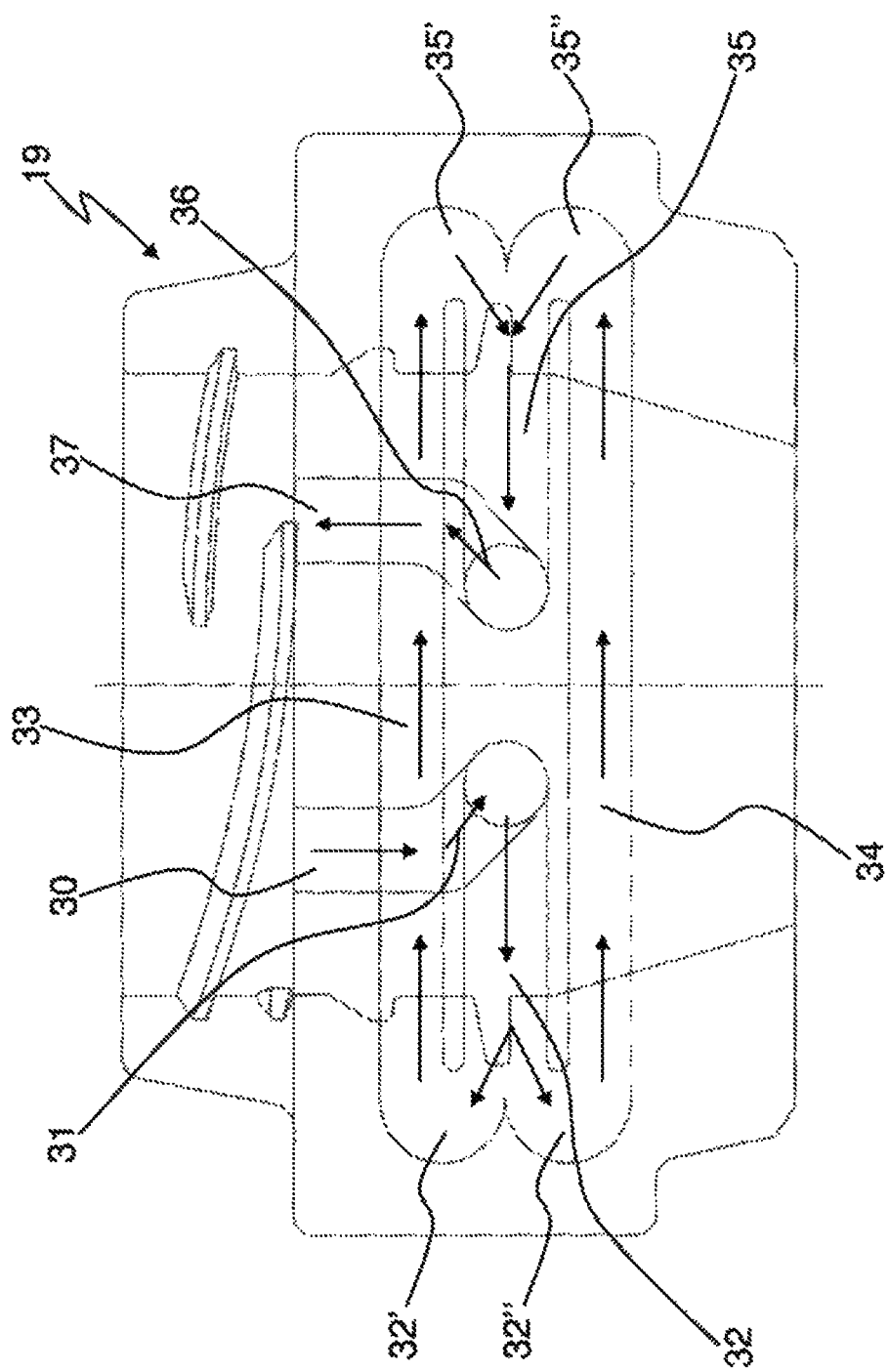
FIG. 4 represents a schematic front view of the cooling circuit provided in the component according to the invention.
Figure 5:
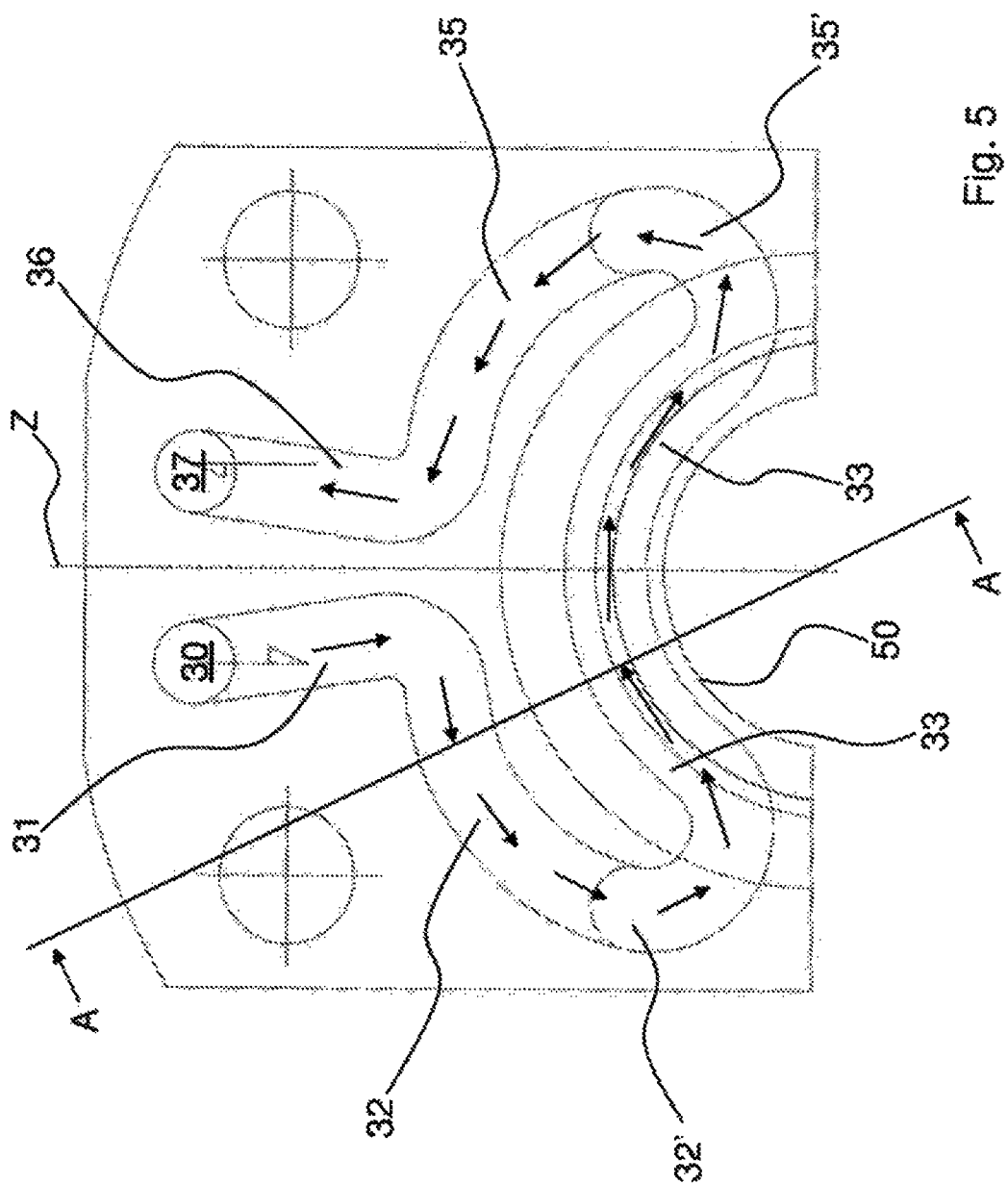
FIG. 5 represents a schematic top view of the cooling circuit provided in the component according to the invention.

The flow of the cooling liquid, generally water, is indicated by the arrows visible in FIG. 4 and in FIG. 5. The cooling liquid enters the cooling circuit through the inlet section 40; if flows through the longitudinal inlet stretch 30, the longitudinal stretch 31 and the curved stretch 32; it subdivides into two flows, flowing through the curved stretch 33 and the curved stretch 34; said two flows again converge into a single flow in the curved stretch 35; said single flow finally flowing through the longitudinal stretch 36 and the longitudinal outlet stretch 37 up to reach the outlet section 41 of the cooling circuit.

Advantageously, ail the stretches of the cooling circuit in each of the half-inserts 18, 19 have a circular or elliptic section and are perfectly connected whereby the cooling circuit presents no edges that can create stagnation points of the cooling liquid and consequent low cooling.

A further advantage is represented by the fact that the distance between the curved stretches 32, 33, 34, 35 and the moulding surface of the mould component of the invention is considerably reduced compared to the distances between the stretches of the cooling circuit and the moulding surface of the mould components known in the prior art.

In particular, the minimum distance $d_1$ between the curved stretch 32 or the curved stretch 35 and the semicircular groove 7' can vary from 0.8 to 5 mm, determining an optimal cooling of the preform at the support ring 7.

Advantageously, the minimum distance $d_3$ between the curved stretch 33 and the semicircular groove 6' can also vary from 0.8 to 5 mm, determining an optimal cooling of the preform above the support ring 7; while the minimum distance $d_4$ between the curved stretch 34 and the half-portion 8' of moulding surface, corresponding to the annular portion 8 of the preform, can vary from 0.8 to 5 mm, determining an optimal cooling of the preform below the support ring 7. Said annular portion 8 of the preform, which in FIGS. 1*a* and 1*b* is represented tapered converging towards the longitudinal axis of the preform, can be either cylindrical or tapered in the direction diverging from the axis of the preform, depending on the type of preform that is to be moulded.

In a first variant, the distances $d_1$, $d_3$ and $d_4$ are equal to each other; in a second variant the distances $d_1$, $d_3$ are $d_4$ are different from each other.

Advantageously, the minimum distance $d_2$ between the curved stretch 32 and the lateral semi-cylindrical surface 50 can vary from 0.8 to 9 mm, depending on the depth of the semi-circular groove 7'; the minimum distance $d_5$ between the curved stretch 33 and the lateral semi-cylindrical surface 50 can vary from 0.8 to 9 mm, depending on the depth of the semicircular groove 6'.

With reference to the section of FIG. 6*a*, the curved stretch 33 crosses a zone of the half-insert adjacent to the moulding surface of the preform above the groove 7', i.e. in proximity of the moulding surface of the threading of the preform neck; while the curved stretch 34 crosses a zone of the half-insert adjacent to the moulding surface of the preform below the groove 7'.

Advantageously, at least one or both of the stretches 33, 34 are, at least partially, provided in the respective portion of the tapered flange 23, 22. In the example of FIG. 6*a*, the curved stretch 33, having for example an elliptic section, is partially provided in the tapered flange portion 23 and partially provided in the central portion 43 of the threaded half-insert, while the curved stretch 34, having for example an elliptic section, is partially provided in the tapered flange portion 22 and partially provided in the central portion 43.

One or both of the stretches 33 and 34 may be entirely produced within the volume of the tapered flange portions 23 and 22, respectively. In the example of FIG. 6*b*, the curved stretch 33, having for example an elliptic section, is entirely provided in the tapered flange portion 23, while the curved stretch 34, having for example an elliptic section, is entirely provided in the tapered flange portion 22.

In the event in which the neck of the preform to be moulded is unthreaded (FIG. 1*b*), one variant of the invention provides that the separate half-inserts 18, 19 not be threaded; therefore the cylindrical end portion 5' of the moulding surface of the component of the invention is not internally threaded. Furthermore, in this event, a further semi-circular groove in the curved inner surface 20 is half the size of a further annular groove having a profile corresponding to that of the possible annular flange 6" for restraining the cap in the event in which the neck is not provided with threading (FIG. 1*b*).

The above-described cooling circuit, in all its variants, allows the cooling of the preform within the mould in the neck zone 3 (FIG. 1) to be significantly improved. As regards the production process for the mould component of the invention, each half-insert 18, 19 can be formed by two parts 44, 45.

In a first variant of the production process, the outermost part 44, comprising the longitudinal stretches 30, 31, 36 and 37 of the cooling circuit is produced by means of a stock-removal process or EDM (Electrical Discharge Machining), while the innermost part 45, comprising the portions of truncated cone flange 22, 23 and the curved stretches 32, 33, 34 and 35, is advantageously produced by means of Sintering Laser Melting or Laser Cusing or equivalent technologies that allow products of this type to be produced starting from metal powder.

In a second variant of the production process, both the outermost part 44 and the innermost part 45 of the threaded half-inserts 18, 19 are advantageously produced by means of Sintering Laser Melting or Laser Cusing starting from metal powder. Application of the Sintering Laser Melting or Laser Cusing technology allows at least the curved stretches 32, 33, 34 and 35 of the cooling circuit to be produced without sharp edges, while perfectly joined together, and much closer to the moulding surface of the mould component of the invention, therefore determining a more effective cooling of the preform being formed within the injection mould.

These technologies can be combined with conventional process such as milling, turning, grinding, polishing, thermal treatments provided for the material used, any thermo-chemical surface treatments, as well as coatings such as PVD, PACVD, chromium plating, etc.

The invention claimed is:

1. A process of manufacturing an injection mould component for moulding the external surface of a preform neck made of plastic material, the injection mould component comprising
    a pair of half-inserts defining, when assembled in the injection mould, a moulding surface of said external surface of the neck;
    said moulding surface defining a longitudinal axis and comprising a first annular groove for making a first annular flange of the preform neck;
    a cylindrical end portion, arranged at a first side of said first annular groove, for making a corresponding cylindrical end portion of the preform neck;
    and a portion proximal to said first annular groove and arranged at a second side of said first annular groove, for making a corresponding portion proximal to the first annular flange,
    wherein each half-insert is provided with an internal circuit for the passage of a cooling liquid;
    said internal circuit being provided with
    a first curved stretch and a second curved stretch provided in proximity of said first annular groove of the moulding surface;
    a third curved stretch provided in proximity of said cylindrical end portion of the moulding surface;
    a fourth curved stretch provided in proximity of a portion of the moulding surface;
    wherein the third curved stretch and the fourth curved stretch are branches of said first curved stretch and converge in said second curved stretch,
    wherein the first curved stretch and the second curved stretch have a respective curvilinear axis, arranged on a first plane which is substantially perpendicular to a plane containing the longitudinal axis of the moulding surface, and are symmetrically arranged with respect to a centre-line plane Z of the half-insert,
    wherein the third curved stretch has a curvilinear axis arranged on a second plane and the fourth curved stretch has a curvilinear axis arranged on a third plane, said second plane and third plane being substantially parallel to said first plane,
    and wherein said first, second and third planes are three distinct planes,
    wherein each half insert consists of two parts integrally connected to each other,
    wherein a first part of said at least two parts comprises the first curved stretch, the second curved stretch, the third curved stretch and the fourth curved stretch,
    the process comprising the production, starting from metal powder, of at least said first part by means of Sintering Laser Melting or Laser Cusing.

2. A process according to claim 1, wherein a second part of said at least two parts of each half-insert, placed so as to be external with respect to the first part once the two half-inserts have been assembled in the injection mould, is made by means of Sintering Laser Melting or Laser Cusing, said second part comprising a longitudinal inlet stretch and a longitudinal outlet stretch for the cooling liquid, and also comprising a first longitudinal connection stretch for connecting the longitudinal inlet stretch to the first curved stretch and a second longitudinal connection stretch for connecting the second curved stretch to the longitudinal outlet stretch.

3. A process according to claim 1, wherein a second part of said at least two parts of each half-insert, placed so as to be external with respect to the first part once the two half-inserts have been assembled in the injection mould, is made by means of a stock-removal process or EDM (Electrical Discharge Machining), said second part comprising a longitudinal inlet stretch and a longitudinal outlet stretch for the cooling liquid, and also comprising a first longitudinal connection stretch for connecting the longitudinal inlet stretch to the first curved stretch and a second longitudinal connection stretch for connecting the second curved stretch to the longitudinal outlet stretch.

* * * * *